United States Patent
Kumar et al.

(10) Patent No.: US 8,527,740 B2
(45) Date of Patent: Sep. 3, 2013

(54) MECHANISM OF SUPPORTING SUB-COMMUNICATOR COLLECTIVES WITH O(64) COUNTERS AS OPPOSED TO ONE COUNTER FOR EACH SUB-COMMUNICATOR

(75) Inventors: Sameer Kumar, Yorktown Heights, NY (US); Amith R. Mamidala, Yorktown Heights, NY (US); Joseph D. Ratterman, Seattle, WA (US); Michael Blocksome, Rochester, MN (US); Douglas Miller, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 645 days.

(21) Appl. No.: 12/697,164

(22) Filed: Jan. 29, 2010

(65) Prior Publication Data

US 2011/0119468 A1    May 19, 2011

Related U.S. Application Data

(60) Provisional application No. 61/293,603, filed on Jan. 8, 2010, provisional application No. 61/261,269, filed on Nov. 13, 2009, provisional application No. 61/293,611, filed on Jan. 8, 2010, provisional application No. 61/295,669, filed on Jan. 15, 2010.

(51) Int. Cl.
*G06F 9/30* (2006.01)

(52) U.S. Cl.
USPC ............................ 712/214; 712/215; 718/104

(58) Field of Classification Search
USPC ............................ 712/11, 214, 215; 718/104
See application file for complete search history.

(56) References Cited

U.S. PATENT DOCUMENTS

| | | | | |
|---|---|---|---|---|
| 5,963,945 | A * | 10/1999 | Pal ........................................ | 1/1 |
| 6,965,982 | B2 * | 11/2005 | Nemawarkar ................. | 712/207 |
| 7,555,607 | B2 * | 6/2009 | Collard et al. ................ | 711/125 |
| 7,555,753 | B2 * | 6/2009 | Olszewski et al. ............ | 718/100 |
| 7,984,242 | B2 * | 7/2011 | Collard et al. ................ | 711/125 |
| 8,087,029 | B1 * | 12/2011 | Lindholm et al. ............ | 718/105 |
| 8,108,872 | B1 * | 1/2012 | Lindholm et al. ............ | 718/104 |
| 8,112,648 | B2 * | 2/2012 | Branover et al. ............. | 713/320 |
| 2004/0064580 | A1 * | 4/2004 | Lim et al. ....................... | 709/238 |
| 2008/0059966 | A1 * | 3/2008 | Du et al. ........................ | 718/102 |

OTHER PUBLICATIONS

Ron Brightwell, Kevin Pedretti, Trammell Hudson, "SMARTMAP: operating system support for efficient data sharing among processes on a multi-core processor," Proceedings of the 2008 ACM/IEEE conference on Supercomputing, 2008, pp. 1-12, IEEE Press, Austin, Texas.

* cited by examiner

*Primary Examiner* — Aimee Li
(74) *Attorney, Agent, or Firm* — Scully, Scott, Murphy & Presser, PC; Daniel P. Morris, Esq.

(57) ABSTRACT

A system and method for enhancing barrier collective synchronization on a computer system comprises a computer system including a data storage device. The computer system includes a program stored in the data storage device and steps of the program being executed by a processor. The system includes providing a plurality of communicators for storing state information for a bather algorithm. Each communicator designates a master core in a multi-processor environment of the computer system. The system allocates or designates one counter for each of a plurality of threads. The system configures a table with a number of entries equal to the maximum number of threads. The system sets a table entry with an ID associated with a communicator when a process thread initiates a collective. The system determines an allocated or designated counter by searching entries in the table.

15 Claims, 2 Drawing Sheets

MECHANISM OF SUPPORTING SUB-COMMUNICATOR COLLECTIVES WITH O(64) COUNTERS AS OPPOSED TO ONE COUNTER FOR EACH SUB-COMMUNICATOR

CROSS-REFERENCE TO RELATED APPLICATIONS

This application claims the benefit of U.S. Patent Application Ser. Nos. 61/261,269, filed Nov. 13, 2009 for "LOCAL ROLLBACK FOR FAULT-TOLERANCE IN PARALLEL COMPUTING SYSTEMS", now abandoned; 61/293,611, filed Jan. 8, 2010 for "A MULTI-PETASCALE HIGHLY EFFICIENT PARALLEL SUPERCOMPUTER", now abandoned; and 61/295,669, filed Jan. 15, 2010 for "SPECULATION AND TRANSACTION IN A SYSTEM SPECULATION AND TRANSACTION SUPPORT IN L2 L1 SUPPORT FOR SPECULATION/TRANSACTIONS IN A2 PHYSICAL ALIASING FOR THREAD LEVEL SPECULATION MULTIFUNCTIONING L2 CACHE CACHING MOST RECENT DIRECTORY LOOK UP AND PARTIAL CACHE LINE SPECULATION SUPPORT", now abandoned; U.S. patent application Ser. No. 61/293,603, filed Jan. 8, 2010 for "MECHANISM OF SUPPORTING SUB-COMMUNICATOR COLLECTIVES WITH O(64) COUNTERS AS OPPOSED TO ONE COUNTER FOR EACH SUB-COMMUNICATOR", now abandoned, the entire content and disclosure of which is incorporated herein by reference; and is related to the following commonly-owned, co-pending United States patent applications, the entire contents and disclosure of each of which is expressly incorporated by reference herein as if fully set forth herein: U.S. patent application Ser. No. 12/684,367, filed Jan. 8, 2010, for "USING DMA FOR COPYING PERFORMANCE COUNTER DATA TO MEMORY"; U.S. patent application Ser. No. 12/684,172, filed Jan. 8, 2010 for "HARDWARE SUPPORT FOR COLLECTING PERFORMANCE COUNTERS DIRECTLY TO MEMORY"; U.S. patent application Ser. No. 12/684,190, filed Jan. 8, 2010 for "HARDWARE ENABLED PERFORMANCE COUNTERS WITH SUPPORT FOR OPERATING SYSTEM CONTEXT SWITCHING"; U.S. patent application Ser. No. 12/684,496, filed Jan. 8, 2010 for "HARDWARE SUPPORT FOR SOFTWARE CONTROLLED FAST RECONFIGURATION OF PERFORMANCE COUNTERS"; U.S. patent application Ser. No. 12/684,429, filed Jan. 8, 2010, for "HARDWARE SUPPORT FOR SOFTWARE CONTROLLED FAST MULTIPLEXING OF PERFORMANCE COUNTERS"; U.S. patent application Ser. No. 12/697,799, for "CONDITIONAL LOAD AND STORE IN A SHARED CACHE"; U.S. patent application Ser. No. 12/684,738, filed Jan. 8, 2010, for "DISTRIBUTED PERFORMANCE COUNTERS"; U.S. patent application Ser. No. 12/684,860, filed Jan. 8, 2010, for "PAUSE PROCESSOR HARDWARE THREAD ON PIN"; U.S. patent application Ser. No. 12/684,174, filed Jan. 8, 2010, for "PRECAST THERMAL INTERFACE ADHESIVE FOR EASY AND REPEATED, SEPARATION AND REMATING"; U.S. patent application Ser. No. 12/684,184 , filed Jan. 8, 2010, for "ZONE ROUTING IN A TORUS NETWORK"; U.S. patent application Ser. No. 12/684,852, filed Jan. 8, 2010, for "PROCESSOR RESUME UNIT"; U.S. patent application Ser. No. 12/684,642, filed Jan. 8, 2010, for "TLB EXCLUSION RANGE"; U.S. patent application Ser. No. 12/684,804, filed Jan. 8, 2010, for "DISTRIBUTED TRACE USING CENTRAL PERFORMANCE COUNTER MEMORY"; U.S. patent application Ser. No. 61/293,237, filed Jan. 8, 2010, for "ORDERING OF GUARDED AND UNGUARDED STORES FOR NO-SYNC I/O", now abandoned; U.S. patent application Ser. No. 12/693,972, filed Jan. 26, 2010, for "DISTRIBUTED PARALLEL MESSAGING FOR MULTIPROCESSOR SYSTEMS"; U.S. patent application Ser. No. 12/688,747, filed Jan. 15, 2010, for "Support for non-locking parallel reception of packets belonging to the same reception FIFO"; U.S. patent application Ser. No. 12/688,773, filed Jan. 15, 2010, for "OPCODE COUNTING FOR PERFORMANCE MEASUREMENT"; U.S. patent application Ser. No. 12/684,776, filed Jan. 8, 2010, for "MULTI-INPUT AND BINARY REPRODUCIBLE, HIGH BANDWIDTH FLOATING POINT ADDER IN A COLLECTIVE NETWORK"; U.S. patent application Ser. No. 12/984,252, for "SPECULATION AND TRANSACTION IN A SYSTEM SPECULATION AND TRANSACTION SUPPORT IN L2 L1 SUPPORT FOR SPECULATION/TRANSACTIONS IN A2 PHYSICAL ALIASING FOR THREAD LEVEL SPECULATION MULTIFUNCTIONING L2 CACHE CACHING MOST RECENT DIRECTORY LOOK UP AND PARTIAL CACHE LINE SPECULATION SUPPORT"; U.S. patent application Ser. No. 13/008,502, for "MEMORY SPECULATION IN A MULTI LEVEL CACHE SYSTEM"; U.S. patent application Ser. No. 13/008,583, for "SPECULATION AND TRANSACTION IN A SYSTEM SPECULATION AND TRANSACTION SUPPORT IN L2 L1 SUPPORT FOR SPECULATION/TRANSACTIONS IN A2 PHYSICAL ALIASING FOR THREAD LEVEL SPECULATION MULTIFUNCTIONING L2 CACHE CACHING MOST RECENT DIRECTORY LOOK UP AND PARTIAL CACHE LINE SPECULATION SUPPORT"; U.S. patent application Ser. 12/984,308, for "MINIMAL FIRST LEVEL CACHE SUPPORT FOR MEMORY SPECULATION MANAGED BY LOWER LEVEL CACHE"; U.S. patent application Ser. No. 12/984,329, for "PHYSICAL ADDRESS ALIASING TO SUPPORT MULTI-VERSIONING IN A SPECULATION-UNAWARE CACHE"; U.S. patent application Ser. No. 61/293,552, filed Jan. 8, 2010, for "LIST BASED PREFETCH", now abandoned; U.S. patent application Ser. No. 12/684,693, filed Jan. 8, 2010, for "PROGRAMMABLE STREAM PREFETCH WITH RESOURCE OPTIMIZATION"; U.S. patent application Ser. No. 61/293,494, filed Jan. 8, 2010, for "NON-VOLATILE MEMORY FOR CHECKPOINT STORAGE", now abandoned; U.S. patent application Ser. No. 61/293,476, filed Jan. 8, 2010, for "NETWORK SUPPORT FOR SYSTEM INITIATED CHECKPOINTS", now abandoned; U.S. patent application Ser. No. 61/293,554, filed Jan. 8, 2010, for "TWO DIFFERENT PREFETCHING COMPLEMENTARY ENGINES OPERATING SIMULTANEOUSLY", now abandoned; U.S. patent application Ser. No. 12/697,015, for "DEADLOCK-FREE CLASS ROUTES FOR COLLECTIVE COMMUNICATIONS EMBEDDED IN A MULTI-DIMENSIONAL TORUS NETWORK"; U.S. patent application Ser. No. 61/293,559, filed Jan. 8, 2010, for "IMPROVING RELIABILITY AND PERFORMANCE OF A SYSTEM-ON-A-CHIP BY PREDICTIVE WEAR-OUT BASED ACTIVATION OF FUNCTIONAL COMPONENTS", now abandoned; U.S. patent application Ser. No. 61/293,569, filed Jan. 8, 2010, for "IMPROVING THE EFFICIENCY OF STATIC CORE TURNOFF IN A SYSTEM-ON-A-CHIP WITH VARIATION", now abandoned; U.S. patent application Ser. No.12/697,043, for "IMPLEMENTING ASYNCHRONOUS COLLECTIVE OPERATIONS IN A MULTI-NODE PROCESSING SYSTEM"; U.S. patent application Ser. No. 13/008,546, for "MULTIFUNCTIONING CACHE"; U.S. patent application Ser. No. 12/697,175 for "I/O ROUTING IN A MULTIDIMENSIONAL TORUS NETWORK"; U.S. patent application Ser. No. 12/684,287, filed Jan. 8. 2010 for "ARBITRATION IN CROSSBAR INTERCONNECT FOR LOW LATENCY"; U.S. patent application Ser. No. 12/684,630, filed Jan. 8, 2010 for "EAGER PROTOCOL ON A CACHE PIPELINE DATAFLOW"; U.S. patent application Ser. No. 12/723,277 for "EMBEDDING GLOBAL BARRIER AND COLLECTIVE IN A TORUS NETWORK"; U.S. patent application Ser. No. 61/293,499, filed Jan. 8, 2010 for "GLOBAL SYNCHRONIZATION OF PARALLEL PROCESSORS USING CLOCK PULSE WIDTH MODULATION", now abandoned; U.S. patent application Ser. No. 61/293,266, filed Jan. 8, 2010 for "IMPLEMENTATION OF MSYNC"; U.S. patent application Ser. No. 12/796,389 for "NON-STANDARD FLAVORS OF MSYNC", now abandoned; U.S. patent application Ser. No.12/698,817 for "HEAP/STACK GUARD PAGES USING A WAKEUP UNIT"; and U.S. patent application Ser. No. 12/774,475 for "REPRODUCIBILITY IN A MULTIPROCESSOR SYSTEM".

STATEMENT REGARDING FEDERALLY SPONSORED RESEARCH OF DEVELOPMENT

This invention was made with Government support under Contract No.: B554331 awarded by the Department of Energy. The Government has certain rights in this invention.

FIELD OF THE INVENTION

The present invention generally relates to a method and system for enhancing barrier synchronization in a computer system, and more particularly, a method and system for enhancing barrier collective synchronization in message passing interface (MPI) applications with multiple processes running on a compute node for use in a massively parallel supercomputer, and further wherein the compute nodes may be connected by a fast interconnection network.

BACKGROUND OF THE INVENTION

In known computer systems, a message passing interface barrier (MPI barrier) is an important collective synchronization operation used in parallel applications or parallel computing. Generally, MPI is a specification for an application programming interface which enables communications between multiple computers. In a blocking barrier, the progress of the process or a thread calling the operation is blocked until all the participating processes invoke the operation. Thus, the barrier ensures that a group of threads or processes, for example in the source code, stop progress until all of the concurrently running threads (or processes) progress to reach the barrier.

A non-blocking bather can split a blocking bather into two phases: an initiation phase, and a waiting phase, for waiting for the barrier completion. A process can do other work in-between the phases while the barrier progresses in the background.

The collection of the processes invoking the barrier operation is embodied in MPI using a communicator. The communicator stores the necessary state information for a barrier algorithm. An application can create as many communicators as needed depending on the availability of the resources. For a given number of processes, there could be exponiential number of communicators resulting in exponential space requirements to store the state. In this context, it is important to have an efficient space bounded algorithm to ensure scalable implementations.

For example, on an exemplary supercomputer system, a barrier operation within a node can be designed via the fetch-and-increment atomic operations. To support an arbitrary communicator, an atomic data entity needs to be associated with the communicator. As discussed above, making every communicator contain this data item leads to storage space waste. In one approach to this problem, a single global data structure element is used for all the communicators. However, as discussed in further detail below, this is inefficient as concurrent operations are serialized when a single resource is available.

In one embodiment of a supercomputer, a node can have several processes and each process can have up to four hardware threads per core. MPI allows for concurrent operations initiated by different threads. However, each of these operations needs to use different communicators. The operations are serialized because there is only a single resource. For all the operations to progress concurrently it is imperative that separate resources need to be allocated to each of the communicators. This results in undesirable use of storage space.

One way of allocating counters is to allocate one counter for each communicator as different threads can only call collectives on different communicators as per the MPI standard. Then, the counter can be immediately located based on a communicator ID. However, a drawback of the above approach results in inferior utilization of memory space.

There is therefore a need for a method and system to allocate counters for communicators while enhancing efficiency of utilization of memory space. Further, there is a need for a method and system to use less memory space when allocating counters. It would also be desirable for a method and system to allocate counters for each communicator using the MPI standard, while reducing memory allocation usage.

BRIEF SUMMARY

In an aspect of the invention, a method for enhancing barrier collective synchronization on a computer system, comprises: providing a computer system including a data storage device, the computer system including a program stored in the data storage device and steps of the program being executed by a processor, the computer system including a multiplicity of processors; providing a plurality of communicators for storing state information for a barrier algorithm; each communicator designating a master core; allocating a counter for each of a plurality of threads; configuring a table with a number of entries equal to a maximum number of threads; setting a table entry with an ID associated with a communicator when a process thread initiates a collective; and determining the allocated counter by searching entries in the table.

In a related aspect, the master core may set the table entry with the ID of the communicator. The threads of at least one non-master core may poll the entries of the master core for determining the counter for use with the collective. The method may further comprise completing a processing operation after the step of determining the allocated counter by searching entries in the table. The processing operation may be a barrier operation or an All_reduce operation.

In another aspect of the invention, a method for enhancing barrier collective synchronization on a computer system, comprises: providing a computer system including a data storage device, the computer system including a program stored in the data storage device and steps of the program being executed by a processor, the computer system including a multiplicity of processors; providing a plurality of communicators for storing state information for a barrier algorithm; creating a central pool of resources; allocating the central pool of resources for each of a plurality of threads; claiming the resource from the pool and freeing the resources from the pool using a master core thread corresponding to one of the plurality of communicators; and allocating and freeing the resources as multiple concurrent communications are occurring simultaneously. The method may further comprise completing a processing operation including a barrier operation or an All_reduce operation.

BRIEF DESCRIPTION OF THE DRAWINGS

These and other objects, features and advantages of the present invention will become apparent from the following detailed description of illustrative embodiments thereof; which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION OF THE INVENTION

Generally, in a blocking barrier, the progress of the process or a thread calling the operation will be blocked until all the participating processes invoked the operation. The collection of the processes invoking the barrier operation is embodied in message passing interface (MPI) using a communicator. The communicator stores the necessary state information for the barrier algorithm. The Barrier operation may use multiple processes/threads on a node. An MPI process may consist of more than one thread. In the text, the software driven processes or threads is used interchangebly where appropriate to explain the mechanisms referred herein.

Fast synchronization primitives on a supercomputer, for example, IBM® Blue Gene®, via the fetch-and-increment atomic mechanism can be used to optimize the MPI barrier collective call within a node with many processes. This intra-node mechanism needs to be coupled with a network barrier for barrier across all the processes. A node can have several processes and each process can have many threads with a maximum limit, for example, of 64. For simultaneous transfers initiated by different threads, different atomic counters need to be used.

Figure 1:
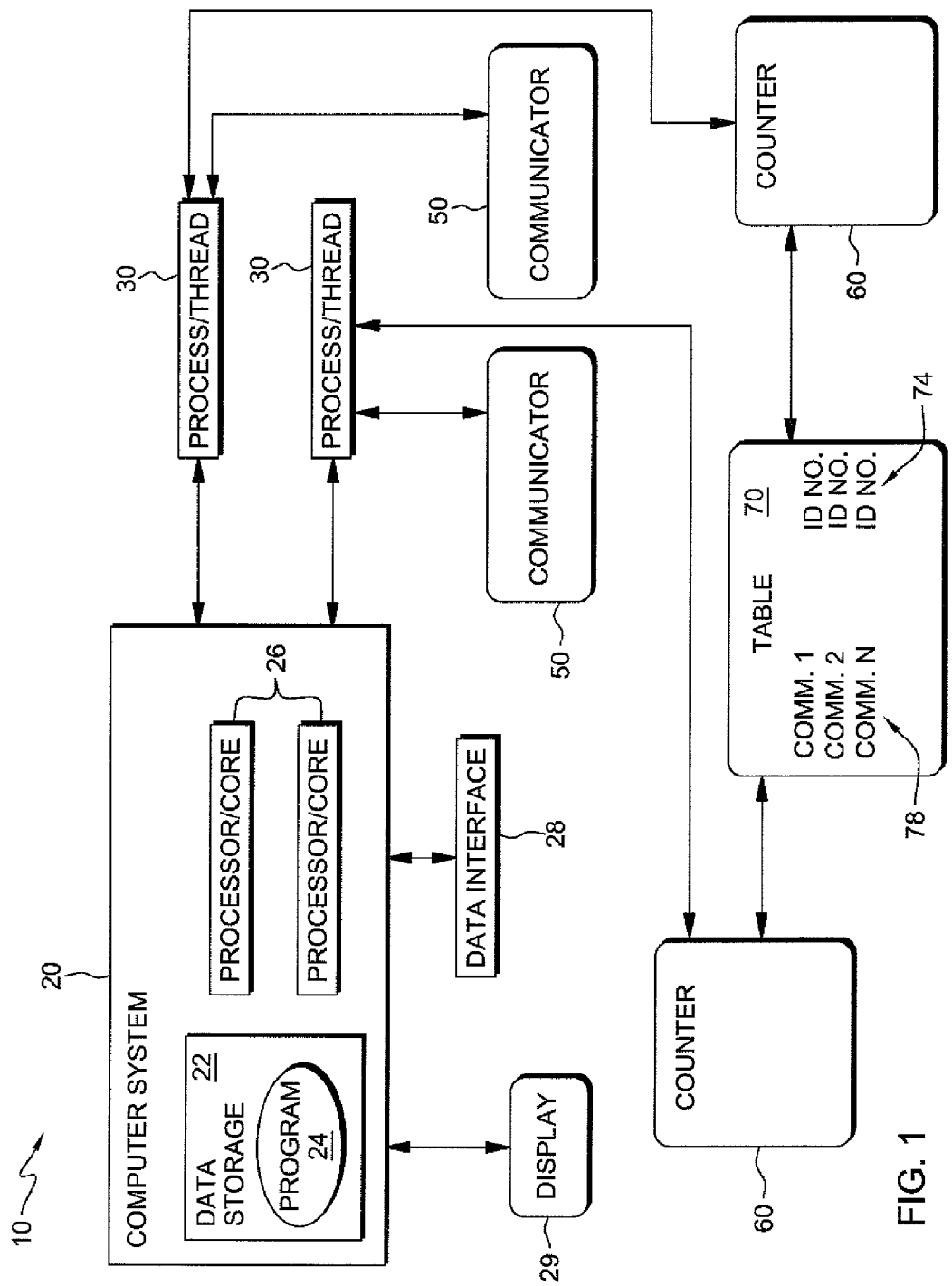
FIG. 1 is a schematic block diagram of a system according to an embodiment of the invention.

Referring to FIG. 1, a system 10 and method according to one embodiment of the invention includes a mechanism wherein each communicator 50 designates a master core in a multi-processor environment of a computer system 20. FIG. 1 shows two processors 26 for illustrative purposes, however, more processors may be used. Also, the illustrated processors 26 are exemplary of processors or cores. One counter 60 for each thread 30 is allocated. A table 70 with a number of entries equal to the maximum number of threads 30 is used by each of the counters 60. The table 70 is populated with the thread entries. When a process thread 30 initiates a collective of processors 26, if it is a master core, it sets a table 70 entry with an ID number 74 of an associated communicator 50. Threads of non-master processes poll the entries of the master process to discover the counter to use for the collective. The counter is discovered by searching entries in the table 70. An advantage of the system 10 is that space overhead is considerably reduced, as typically only a small number of communicators are used at a given time occupying the first few slots in the table.

Similarly, in another embodiment of the invention, the system above used for blocking communications can be extended to non-blocking communications. Instead of using a per thread resource allocation, a central pool of resources can be allocated. A master process or thread per communicator is responsible for claiming the resources from the pool and freeing the resources after their usage. The resources are allocated and freed in a safe manner as multiple concurrent communications can occur simultaneously. More specifically, as the resources are mapped to the different communications, care must be taken that no two communications get the same resource, otherwise, the operation is error prone. The process or thread participating in the resource allocation/de-allocation should use mechanisms such as locking to prevent such scenarios.

For a very large number of communicators, allocating one counter per communicator will pose severe scalability issues. Using such large number of counters results in a wastage of memory space, especially in a computer system that has limited memory per thread.

When blocking communications, one counter per thread is needed in a process, as that is the maximum number of active collective operations via MPI. In the present invention, the system 10 includes a mechanism where each communicator 50 designates a master core 26 in the multi-processor environment. In the system 10, there is one counter 60 for each thread 30, and each counter has a table 70 with a number of entries equal to the maximum number of threads. When a process thread 30 initiates a collective of processors 26, if it is the master core it sets the table 70 entry 78 with the ID 74 of the communicator 50. Threads 30 of non-master processes just poll the entries 78 of the master process to discover the counter 60 to use for the collective. Table 1 below further illustrates the basic mechanism of the system 10.

In Table 1: #counters=#threads=64 on a super computer system; Processes or threads Ids={0, 1, 2, 3}; Running on cores={0, 1, 2, 3}; Communicator 1={0, 1, 2}; Master core=0; Communicator 2={1, 2, 3}; and Master core=1. Table entries are as below:

TABLE 1

| Communicator | Atomic Counter |
| --- | --- |
| Communicator 1 | Atomic Counter 1 |
| Communicator 2 | Atomic Counter 2 |
| Null | Null |
| Null | Null |

In Table 1 above, the counter is discovered by searching entries in the table, however, space overhead is considerably reduced. The searching power overhead for a computer is small, as typically only a small number of communicators are given time to occupy the first few slots in the table.

In another embodiment of the invention, for non-blocking communications, instead of using a per thread resource allocation, a central pool of resources is allocated. A master process or thread per communicator is responsible for claiming the resources from this pool and freeing the resources after their usage. However, it is important that the resources are allocated/freed in a safe manner as multiple concurrent communications can happen simultaneously.

Additionally, the mechanism/system 10 according to the present invention may be applied to other collective operations needing finite amount of resources for their operation. The mechanisms applied in the present invention can also be applied to other collective operations such as an MPI operation, for example, MPI Allreduce. Such an operation as MPI_Allreduce performs a global reduce operation on the data provided by the application. Similar to the Barrier operation with multiple processes/threads on a node, it also requires a shared pool of resources, in this context, a shared pool of memory buffers where the data can be reduced. The algorithm described in this application for resource sharing can be applied to shared the pool of memory buffers for MPI_Allreduce for different communicators.

Thereby, in the present invention, the system 10 provides a mechanism where each communicator designates a master core in the multi-processor environment. One counter for each thread is allocated and has a table with number of entries equal to the maximum number of threads. When a process thread initiates a collective, if it is the master core, it sets the table entry with the ID of the communicator. Threads of non-master processes just poll the entries of the master process to discover the counter to use for the collective.

Figure 2:
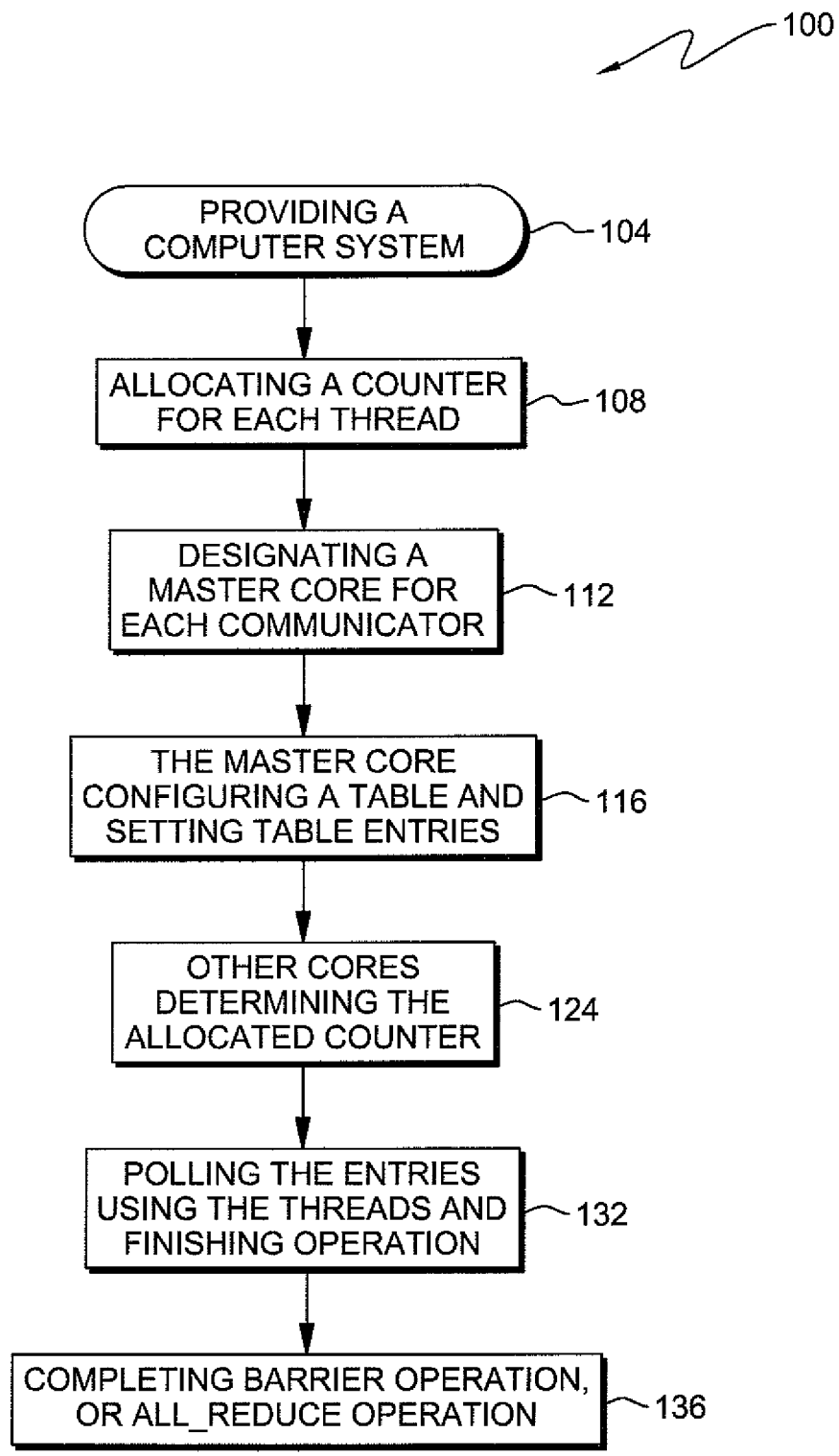
FIG. 2 is a flow chart of a method according to the embodiment of the invention depicted in FIG. 1.

Referring to FIG. 2, a method 100 according to the embodiment of the invention depicted in FIG. 1 includes in step 104 providing a computer system. The computer system 10 (FIG. 1) includes a data storage device 22, a program 24 stored in the data storage device and a multiplicity of processors 26. Step 108 includes allocating a counter for each of a plurality of threads. Step 112 includes providing a plurality of communicators for storing state information for a barrier algorithm, and each communicator designates a master core for each communicator. Step 116 includes the master core configuring a table with a number of entries equal to a maximum number of threads, and setting table entries. The table entries include setting a table entry with an ID associated with a communicator when a process thread initiates a collective. Step 124 includes determining the allocated counter by searching entries in the table using other cores, i.e., non-master cores. Step 132 includes the threads of at least one non-master core polling the entries of the master core for determining the counter for use with the collective, and finishing operations. Step 136 includes completing a barrier operation or an All_reduce operation.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the FIGS. 1-2 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the present invention has been particularly shown and described with respect to preferred embodiments thereof, it will be understood by those skilled in the art that changes in forms and details may be made without departing from the spirit and scope of the present application. It is therefore intended that the present invention not be limited to the exact forms and details described and illustrated herein, but falls within the scope of the appended claims.

What is claimed is:

1. A method for enhancing barrier collective synchronization on a computer system, comprising:
   providing a computer system including a plurality of processing devices, a data storage device, a program stored in the data storage device;
   providing a plurality of communicators for storing state information for a plurality of operations;
   providing a plurality of counters;
   allocating a respective one of the counters to each of the communicators;
   operating a plurality of process threads on the computer system, wherein each of the threads is associated with a respective one of the communicators;
   when one of the process threads initiates a barrier operation, configuring a table including setting a respective one entry in the table with an ID of the communicator associated with said one of the process threads and with an ID of the counter allocated to said associated communicator; and
   others of the process threads using said table for determining the counter used in said barrier operation.

2. The method of claim 1, wherein a master core sets the table entry with the ID of the communicator.

3. The method of claim 2, wherein the threads of at least one non-master core polls the entries of the master core for determining the counter for use with the collective.

4. The method of claim 1, further comprising:
   completing a processing operation after the step of determining the allocated counter by searching entries in the table.

5. The method of claim 4, wherein the processing operation is barrier operation or an All_reduce operation.

6. A system for enhancing barrier collective synchronization on a computer system including a plurality of processing devices, a data storage device, and a program stored on the data storage device, the system for enhancing barrier collective synchronization comprising:
   a plurality of communicators for storing state information for a barrier algorithm;
   a plurality of counters, a respective one of the counters being allocated to each of the communicators;
   one or more of the plurality of processing devices configured for;
   operating a plurality of process threads, wherein each of the threads is associated with a respective one of the communicators;
   when one of the process threads initiates a barrier operation, configuring a table including setting a respective one entry in the table with an ID of the communicator associated with said one of the process threads and with an ID of the counter allocated to said associated communicator; and wherein others of the process threads use said table for determining the counter used in said barrier operation.

7. The system of claim 6, wherein a master core sets the table entry with the ID of the communicator.

8. The system of claim 7, wherein the threads of at least one non-master core polls the entries of the master core for determining the counter for use with the collective.

9. The system of claim 6, wherein a processing operation is completed after the step of determining the allocated counter by searching entries in the table.

10. The system of claim 9, wherein the processing operation is barrier operation or an All_reduce operation.

11. A computer program product comprising a computer readable device having a computer program recorded thereon and for execution in a computer system for enhancing barrier collective synchronization on the computer system, wherein the computer system includes a plurality of processing devices and a data storage device, the program steps comprising:
   storing information for a plurality of operations;
   providing a plurality of counters;
   allocating a respective one of the counters to each of the communicators;
   operating a plurality of process threads on the computer system, wherein each of the threads is associated with a respective one of the communicators; in a plurality of communicators, wherein a respective one counter is allocated to each of the communications, a plurality of process threads operate on the computer system, and each of the threads is associated with a respective one of the communications;
   when one of the process threads initiates a barrier operation, configuring a table including setting a respective one entry in the table with an ID of the communicator associated with said one of the process threads and with an ID of the counter allocated to said associated communicator; and
   others of the process threads using said table for determining the counter used in said barrier operation.

12. The computer program product of claim 11, wherein a master core sets the table entry with the ID of the communicator.

13. The computer program product of claim 12, further comprising: polling the entries of the master core using the threads of at least one non-master core for determining the counter for use with the collective.

14. The computer program product of claim 11, further comprising:

completing a processing operation after the step of determining the allocated counter by searching entries in the table.

15. The computer program product of claim 14, wherein the processing operation is barrier operation or an All_reduce operation.

\* \* \* \* \*